(12) United States Patent
Yamamoto

(10) Patent No.: US 10,732,353 B2
(45) Date of Patent: Aug. 4, 2020

(54) WAVELENGTH MULTIPLEXING OPTICAL MODULE, WAVELENGTH DEMULTIPLEXING OPTICAL MODULE, AND OPTICAL MODULE

(71) Applicant: FUJITSU LIMITED, Kawasaki-shi, Kanagawa (JP)

(72) Inventor: Tsuyoshi Yamamoto, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/515,129

(22) Filed: Jul. 18, 2019

(65) Prior Publication Data

US 2020/0041727 A1 Feb. 6, 2020

(30) Foreign Application Priority Data

Aug. 3, 2018 (JP) .................. 2018-146586

(51) Int. Cl.
*H04J 14/02* (2006.01)
*G02B 6/293* (2006.01)
*G02B 6/42* (2006.01)
*H04B 10/50* (2013.01)
*F21V 8/00* (2006.01)

(52) U.S. Cl.
CPC ......... *G02B 6/2938* (2013.01); *G02B 6/0055* (2013.01); *G02B 6/4206* (2013.01); *H04B 10/501* (2013.01); *H04J 14/02* (2013.01)

(58) Field of Classification Search
CPC .... H04J 14/02; H04J 14/0201; G02B 6/2938; G02B 6/0055; G02B 6/4206; G02B 6/29367; G02B 6/12004; G02B 6/3512; G02B 6/4246; G02B 6/4215; G02B 27/1006; G02B 6/29395; H04B 10/2503; H04B 10/40; H04B 10/2504; H04B 10/501
USPC ............ 398/68, 79, 84, 85, 140, 135, 87, 86
See application file for complete search history.

(56) References Cited

U.S. PATENT DOCUMENTS 6,008,920 A * 12/1999 Hendrix ............... G02B 6/2938
359/633
6,563,976 B1 * 5/2003 Grann ................ G02B 6/29311
385/24

(Continued)

FOREIGN PATENT DOCUMENTS

| JP | 2005-017811 | 1/2005 |
| JP | 2005-274700 | 10/2005 |
| WO | 2006/134675 | 12/2006 |

*Primary Examiner* — Hibret A Woldekidan
(74) *Attorney, Agent, or Firm* — Fujitsu Patent Center

(57) ABSTRACT

A module includes a substrate, a transmission member and a reflection member, wherein on the substrate, surface emitting elements which emit light having different wavelengths are arranged side by side in a predetermined direction, the transmission member has a first surface which is parallel to the substrate and a second surface which is opposite to the first surface, the reflection member has a third surface which is parallel to the second surface of the transmission member, the second surface of the transmission member is inclined in the predetermined direction relative to the first surface and faces the third surface of the reflection member with an air layer in between, on the second surface of the transmission member, optical filters are arranged linearly side by side and the plurality of optical filters.

11 Claims, 12 Drawing Sheets

(56) References Cited

U.S. PATENT DOCUMENTS

| | | | | |
|---|---|---|---|---|
| 8,488,244 B1* | 7/2013 | Li | ............... | G02B 27/1006 |
| | | | | 359/618 |
| 9,191,118 B2* | 11/2015 | Hui | ............... | H04B 10/2503 |
| 9,391,709 B2* | 7/2016 | Tamura | ............... | H04B 10/506 |
| 10,222,553 B2* | 3/2019 | Dannenberg | ............... | G02B 6/29367 |
| 2003/0002101 A1* | 1/2003 | Kropp | ............... | G02B 6/29367 |
| | | | | 398/79 |
| 2004/0101247 A1* | 5/2004 | Chen | ............... | G02B 6/29367 |
| | | | | 385/47 |
| 2009/0103923 A1* | 4/2009 | Hosomi | ............... | G02B 6/4215 |
| | | | | 398/91 |
| 2011/0058771 A1* | 3/2011 | Lee | ............... | G02B 6/4215 |
| | | | | 385/33 |
| 2014/0248057 A1* | 9/2014 | Li | ............... | G02B 6/29365 |
| | | | | 398/82 |
| 2016/0246008 A1* | 8/2016 | Tan | ............... | G02B 6/29365 |
| 2019/0200104 A1* | 6/2019 | Xiao | ............... | H04Q 11/0005 |

* cited by examiner

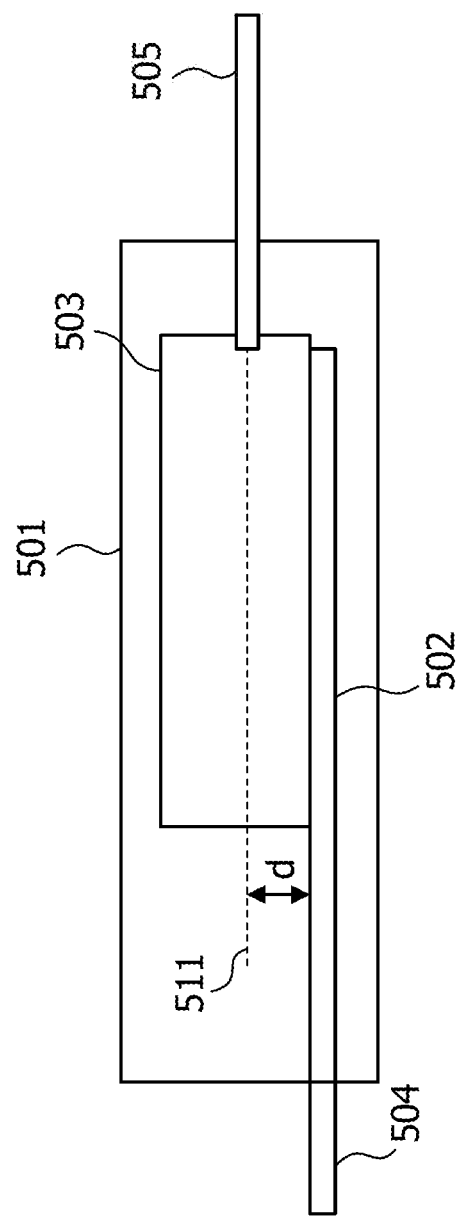

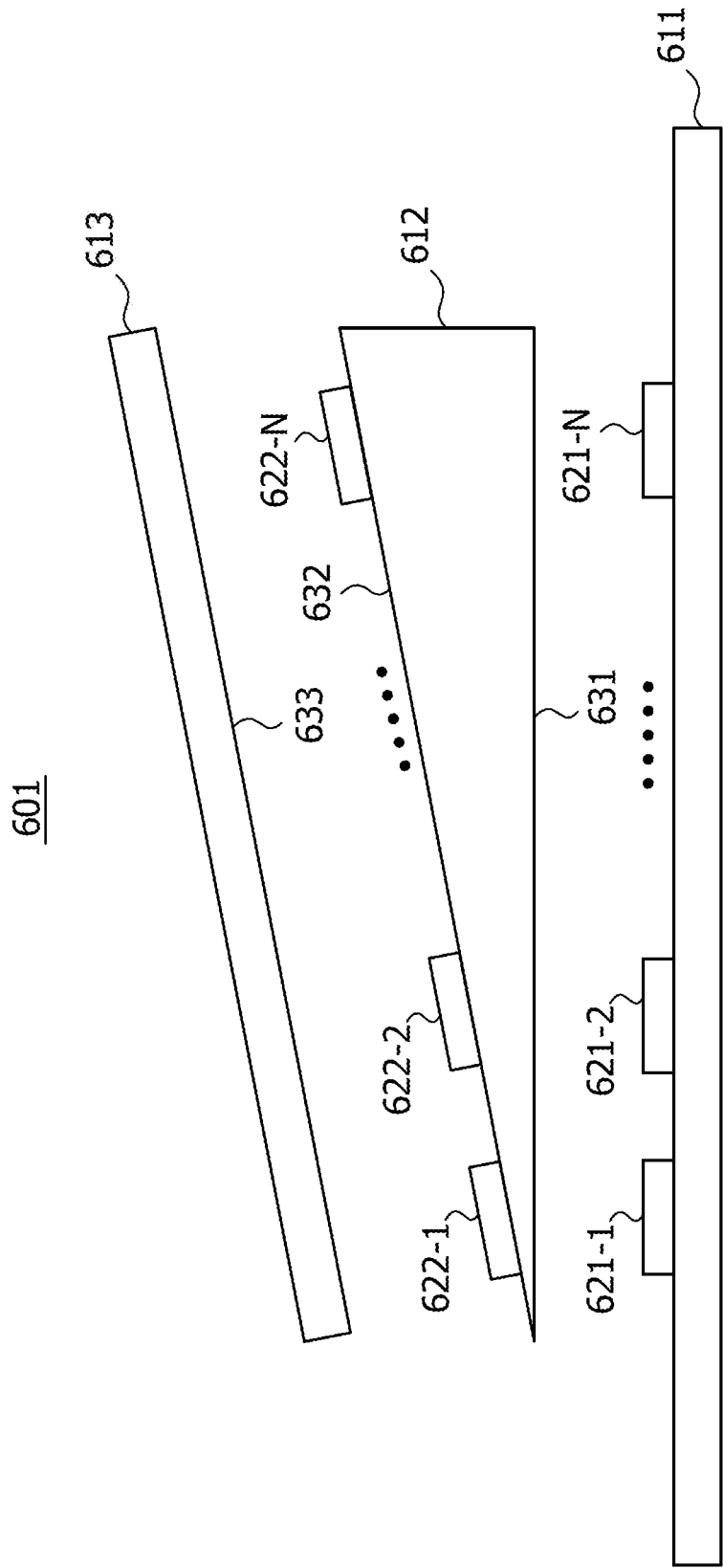

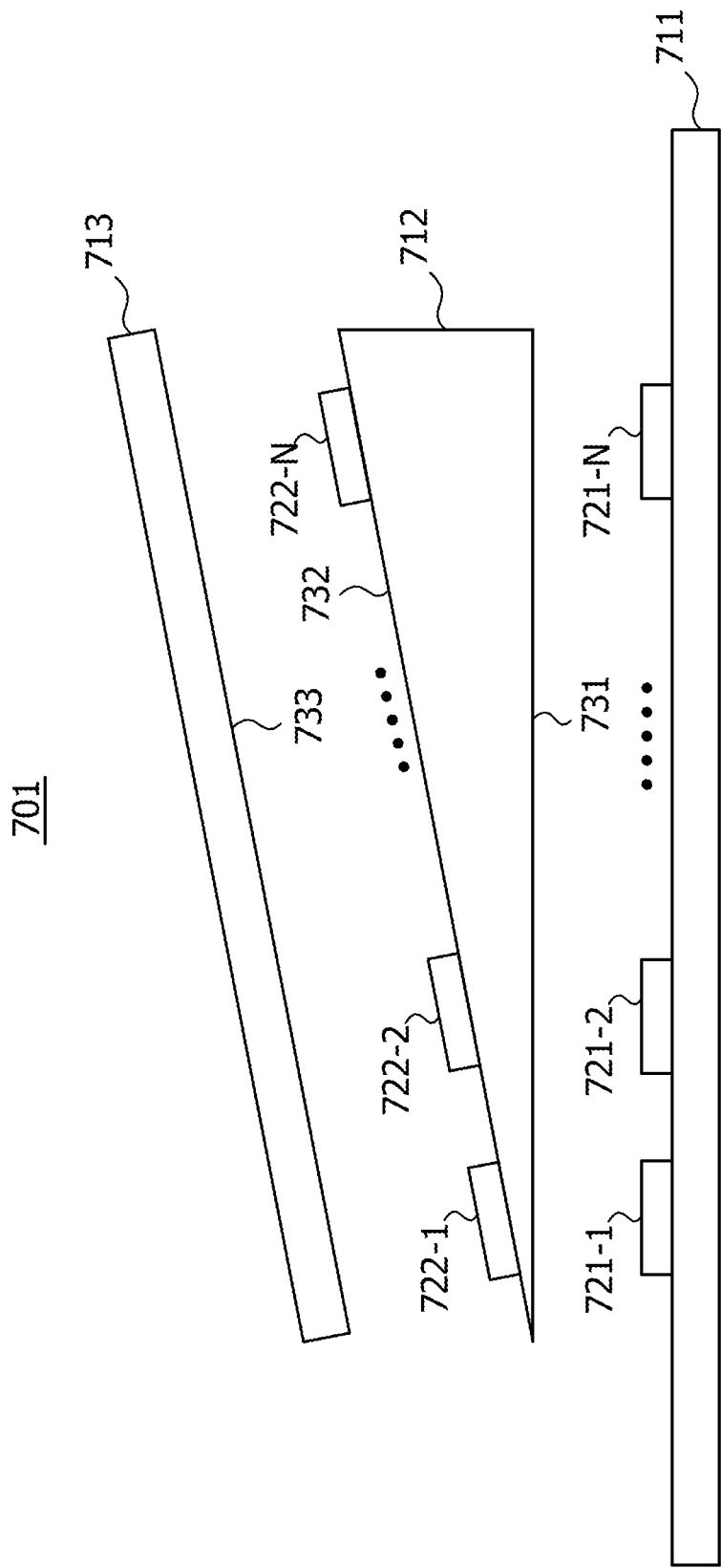

US 10,732,353 B2

WAVELENGTH MULTIPLEXING OPTICAL MODULE, WAVELENGTH DEMULTIPLEXING OPTICAL MODULE, AND OPTICAL MODULE

CROSS-REFERENCE TO RELATED APPLICATION

This application is based upon and claims the benefit of priority of the prior Japanese Patent Application No. 2018-146586, filed on Aug. 3, 2018, the entire contents of which are incorporated herein by reference.

FIELD

The embodiments discussed herein are related to a wavelength multiplexing optical module, a wavelength demultiplexing optical module, and an optical module.

BACKGROUND

A vertical cavity surface emitting laser (VCSEL) is a type of laser diodes and emits light in a direction perpendicular to a substrate. VCSELs are characterized by their low manufacturing costs and are often used in optical interconnects. Applying the wavelength multiplexing technique using a plurality of VCSELs that emit light of different wavelengths to a Quad Small Form-factor Pluggable (QSFP) module makes it possible to increase the transmission band of an existing optical fiber.

QSFP modules are used, for example, for short-distance communications between servers or between switches in a data center. The application of the wavelength multiplexing technique enables wide-band optical signals to be transmitted by means of a single optical fiber. Hence, it becomes possible to implement wide-band transmission by utilizing an existing 2-core optical cable (duplex fiber) without additionally laying parallel optical fibers.

A general QSFP module allows 4-channel optical signals to be transmitted and received using 8 optical fibers included in an 8-core optical cable. If the wavelength multiplexing technique is applied to such a QSFP module to multiplex a 4-channel optical signal in one optical fiber, it becomes possible to transmit and receive 4-channel optical signals using a 2-core optical cable.

Regarding the wavelength multiplexing optical transmission, various optical control modules and optical multiplexers and demultiplexers are known.

Related techniques are disclosed in, for example, Japanese Laid-open Patent Publication Nos. 2005-17811 and 2005-274700, International Publication Pamphlet No. WO 2006/134675, and the like.

In the case where the wavelength multiplexing technique using VCSELs is applied to a QSFP module, light emitted in a direction perpendicular to the substrate is to be multiplexed. For this reason, it is difficult to thin the QSFP module.

Such a problem is not limited to the QSFP modules using VCSELs but occurs also in other optical modules using other surface emitting elements. Such a problem is not limited to the optical modules using surface emitting elements but occurs also in optical modules using light receiving elements.

In view of these, it is desirable to thin an optical module using surface emitting elements or light receiving elements.

SUMMARY

According to an aspect of the embodiments, a wavelength multiplexing optical module includes a substrate, a transmission member and a reflection member, wherein on the substrate, a plurality of surface emitting elements which emit light having different wavelengths are arranged side by side in a predetermined direction, the transmission member has a first surface which is parallel to the substrate and a second surface which is opposite to the first surface, the reflection member has a third surface which is parallel to the second surface of the transmission member, the second surface of the transmission member is inclined in the predetermined direction relative to the first surface and faces the third surface of the reflection member with an air layer in between, on the second surface of the transmission member, a plurality of optical filters are arranged linearly side by side, and the plurality of optical filters are arranged such that light emitted from a surface emitting element other than a predetermined surface emitting element among the plurality of surface emitting elements passes through the transmission member and any of the optical filters, and is then reflected by the third surface of the reflection member and any of the optical filters, being combined with light emitted from the predetermined surface emitting element and having passed through the transmission member and a predetermined optical filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a cross-section of a QSFP module;
FIG. 6 is a configuration diagram of a wavelength multiplexing optical module;
FIG. 7 is a configuration diagram of a wavelength demultiplexing optical module.

DESCRIPTION OF EMBODIMENTS

Hereinafter, embodiments are described in detail with reference to the drawings.

Figure 1:
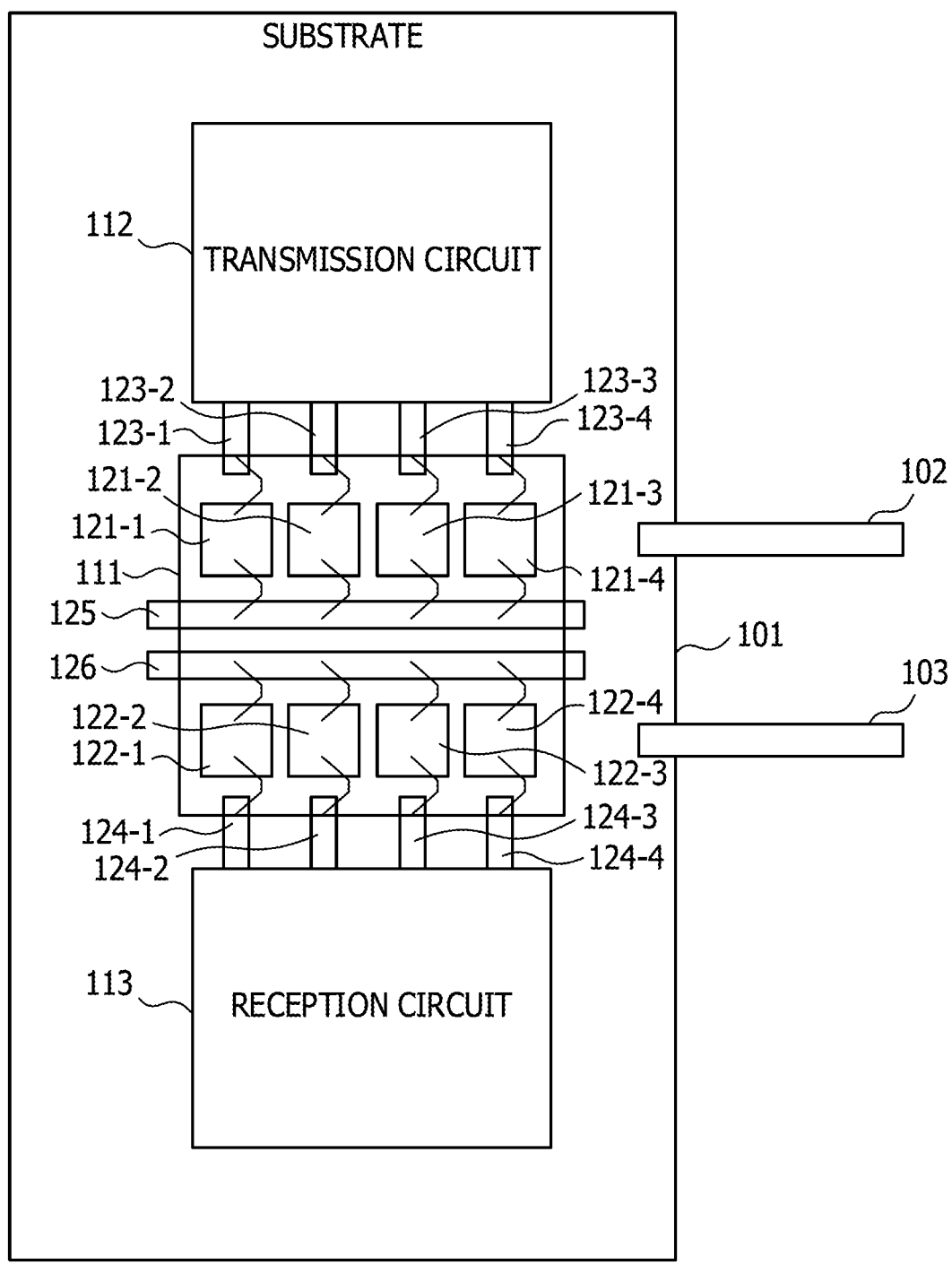
FIG. 1 is a configuration diagram of an optical module.

FIG. 1 illustrates a configuration example of an optical module that transmits and receives wavelength multiplexed light. The optical module of FIG. 1 includes a substrate 101, and transmits a 4-channel optical signal using an optical fiber 102 for transmission and receives a 4-channel optical signal using an optical fiber 103 for reception.

In a region 111 on the substrate 101, mounted are VCSELs 121-1 to 121-4 and photodiodes (PDs) 122-1 to 122-4. The VCSELs 121-1 to 121-4 are arranged at equal intervals and the PDs 122-1 to 122-4 are also arranged at equal intervals.

On one side of the region 111, mounted is a transmission circuit 112, and on the other side of the region 111, mounted is a reception circuit 113. For example, the transmission circuit 112 and the reception circuit 113 are integrated circuits (ICs).

On the substrate 101, disposed are signal electrodes 123-1 to 123-4, which are connected to the transmission circuit 112, signal electrodes 124-1 to 124-4, which are connected to the reception circuit 113, a ground electrode 125, and a ground electrode 126.

The VCSEL 121-$i$ ($i=1$ to 4) is connected to the signal electrode 123-$i$ and the ground electrode 125 and emits light having a wavelength of $\lambda i$. The VCSEL 121-$i$ modulates the light having a wavelength of $\lambda i$ using an electrical signal from the signal electrode 123-$i$ to generate an optical signal having a wavelength of $\lambda i$. The optical signals having wavelengths of $\lambda 1$ to $\lambda 4$, which are emitted by the VCSELs 121-1 to 121-4, are combined to generate wavelength multiplexed light. The wavelength multiplexed light thus generated is outputted to the optical fiber 102.

The PD 122-$i$ ($i=1$ to 4) is connected to the signal electrode 124-$i$ and the ground electrode 126 and receives the optical signal having a wavelength of $\lambda i$ among the optical signals having wavelengths of $\lambda 1$ to $\lambda 4$ contained in the wavelength multiplexed light outputted from the optical fiber 103. The PD 122-$i$ performs photoelectric conversion on the optical signal having a wavelength of $\lambda i$ to generate an i-th-channel electrical signal and outputs the electrical signal thus generated to the signal electrode 124-$i$.

Figure 2:
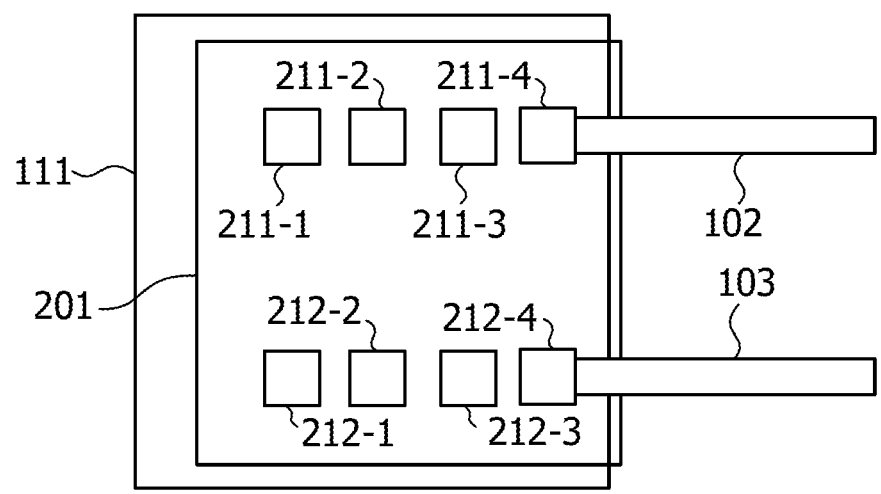
FIG. 2 is a configuration diagram of an optical block.

FIG. 2 illustrates a configuration example of an optical block included in the optical module of FIG. 1. The optical block 201 of FIG. 2 is fixed above the region 111, so that a space is left between the substrate 101 and the optical block 201. The optical block 201 is a transmission member made of glass or a transparent resin, for example.

On an extension line of the optical fiber 102 on the bottom surface of the optical block 201, wavelength filters 211-1 to 211-4 are disposed. On an extension line of the optical fiber 103, wavelength filters 212-1 to 212-4 are disposed. The wavelength filters 211-1 to 211-4 are arranged at equal intervals and the wavelength filters 212-1 to 212-4 are arranged at equal intervals. The wavelength filters 211-$i$ and 212-$i$ ($i=1$ to 4) may be multilayer wavelength filters.

Figure 3:
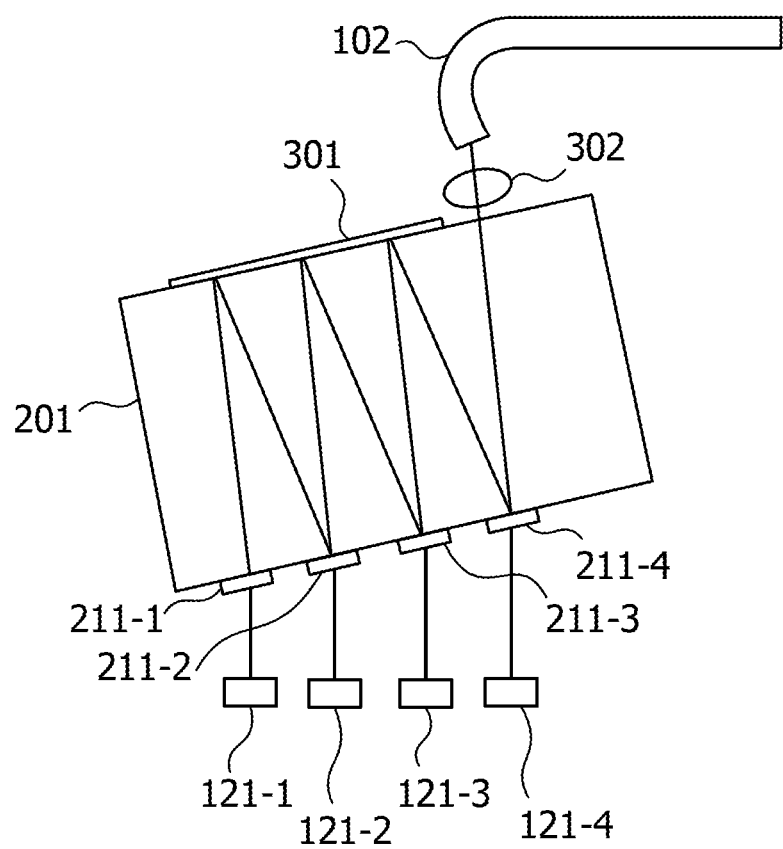
FIG. 3 is a diagram illustrating a cross-section of the optical block.

FIG. 3 illustrates an example of a cross-section of the optical block 201 on the extension line of the optical fiber 102 of FIG. 2. The upper surface and the bottom surface of the optical block 201 are inclined at a predetermined angle relative to the substrate 101. On the upper surface, attached is a reflection film 301. On the bottom surface, attached are the wavelength filters 211-1 to 211-4. Between the upper surface of the optical block 201 and the entrance of the optical fiber 102, disposed is a lens 302.

Figure 4A:
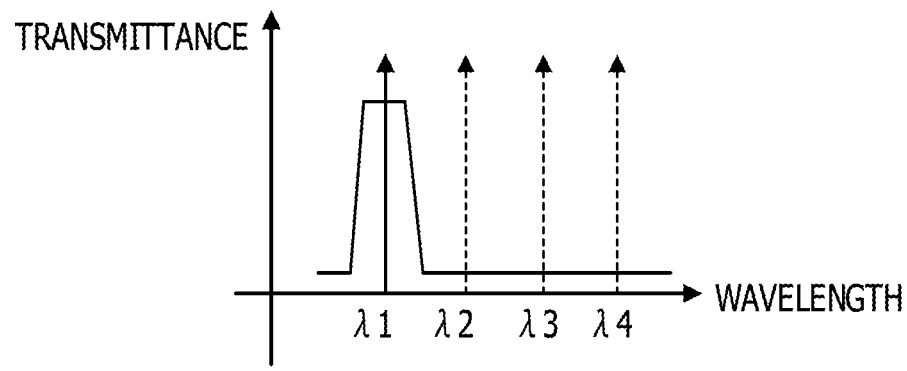
FIGS. 4A to 4D are diagrams illustrating transmission characteristics of wavelength filters.
Figure 4B:
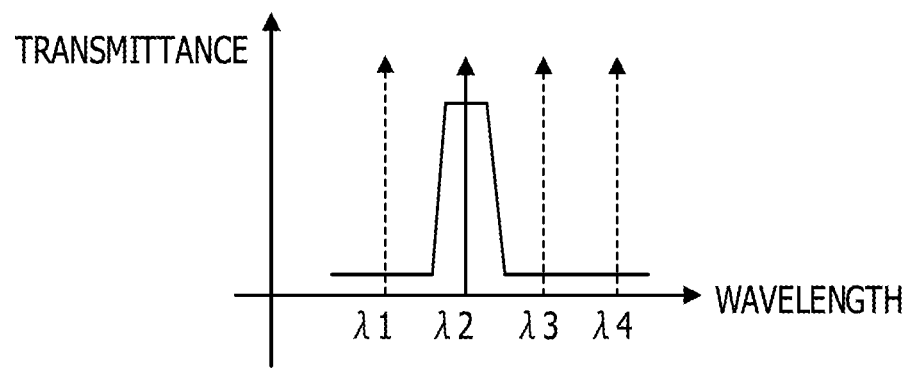
Figure 4C:
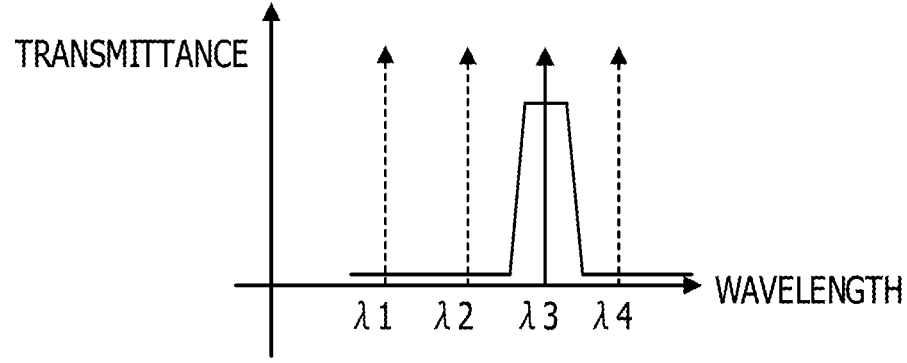
Figure 4D:
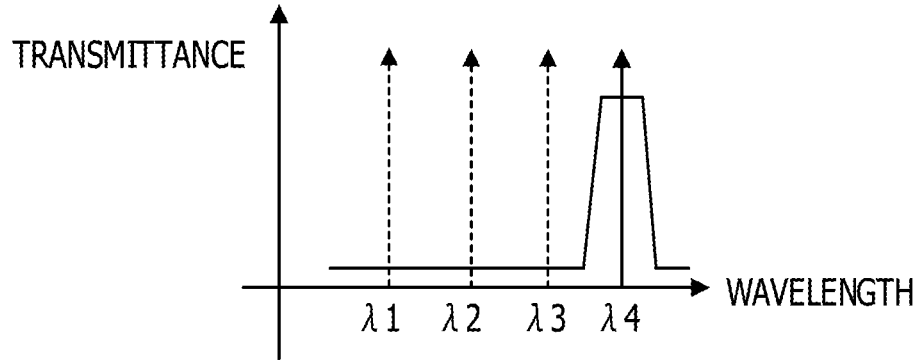

FIGS. 4A to 4D illustrate examples of transmission characteristics of the wavelength filters 211-1 to 211-4. FIG. 4A illustrates an example of the transmission characteristics of the wavelength filter 211-1, FIG. 4B illustrates an example of the transmission characteristics of the wavelength filter 211-2, FIG. 4C illustrates an example of the transmission characteristics of the wavelength filter 211-3, and FIG. 4D illustrates an example of the transmission characteristics of the wavelength filter 211-4.

The horizontal axis represents wavelength and the vertical axis represents transmittance. In this example, $\lambda 1 < \lambda 2 < \lambda 3 < \lambda 4$. The wavelength filter 211-$i$ ($i=1$ to 4) transmits the light having a wavelength of $\lambda i$ out of the light having wavelengths of $\lambda 1$ to $\lambda 4$ and reflects the light having the other wavelengths.

The optical signal having a wavelength of $\lambda 1$ emitted from the VCSEL 121-1 of FIG. 3 passes through the wavelength filter 211-1 and the optical block 201, and is then reflected by the reflection film 301 and the wavelength filters 211-2 to 211-4. The optical signal having a wavelength of $\lambda 2$ emitted from the VCSEL 121-2 passes through the wavelength filter 211-2 and the optical block 201, and is then reflected by the reflection film 301 and the wavelength filters 211-3 and 211-4.

The optical signal having a wavelength of $\lambda 3$ emitted from the VCSEL 121-3 passes through the wavelength filter 211-3 and the optical block 201, and is then reflected by the reflection film 301 and the wavelength filter 211-4. The optical signal having a wavelength of $\lambda 4$ emitted from the VCSEL 121-4 passes through the wavelength filter 211-4 and is combined with the optical signals having wavelengths of $\lambda 1$ to $\lambda 3$ reflected by the wavelength filter 211-4. In this way, wavelength multiplexed light containing the optical signals having wavelengths of $\lambda 1$ to $\lambda 4$ is generated. The wavelength multiplexed light thus generated is concentrated by the lens 302 and is incident on the entrance of the optical fiber 102.

The size of the housing of the QSFP modules is specified by a multi-source agreement (MSA). To house the optical block 201 in the housing, it is desirable that the optical block 201 be thinner.

FIG. 5 illustrates an example of a cross-section of a QSFP module. Inside the housing 501, a substrate 502 and an optical unit 503 are housed. To the substrate 502, a connector 504 for electrical signals is connected. To the optical unit 503, an optical fiber 505 is connected. The substrate 502 corresponds to the substrate 101 of FIG. 1, the optical unit 503 corresponds to the optical block 201 of FIG. 2, and the optical fiber 505 corresponds to the optical fiber 102 or the optical fiber 103.

According to the specifications of the MSA, it is desirable that the distance d from the surface of the substrate 502 to a center line 511 of the optical fiber 505 be about 3 mm or less. If the height of the space used for mounting the VCSELs on the substrate 502 is supposed to be about 1 mm, the remaining height is 2 mm or less.

However, since the four VCSELs 121-$i$ are arranged at equal intervals on the substrate, the four wavelength filters 211-$i$ are also arranged at equal intervals on the bottom surface of the optical block 201. Hence, in the configuration in which an optical signal is sent from one wavelength filter to the next wavelength filter while the optical signal is reflected back and forth within the optical block 201 as illustrated in FIG. 3, it is difficult to reduce the thickness of the optical block 201.

Furthermore, in the configuration of FIG. 3, the end portion of the optical fiber 102, which horizontally extends, is bent downward in order to make the wavelength multiplexed light incident on the optical fiber 102. For this reason, the height of the bent end portion of the optical fiber 102 is added to the thickness of the optical block 201.

FIG. 6 illustrates a configuration example of a wavelength multiplexing optical module of an embodiment. The wavelength multiplexing optical module 601 of FIG. 6 includes a substrate 611, a transmission member 612, and a reflection member 613.

On the substrate 611, N (N is an integer of 2 or more) surface emitting elements 621-$i$ ($i=1$ to N) that emit light having different wavelengths, are arranged side by side in a predetermined direction. The transmission member 612 has a first surface 631 which is parallel to the substrate 611, and a second surface 632 which is opposite to the first surface 631. The reflection member 613 has a third surface 633 which is parallel to the second surface 632.

The second surface 632 is inclined in the above-mentioned predetermined direction relative to the first surface 631 and faces the third surface 633 with an air layer in between. On the second surface 632, N optical filters 622-$i$ ($i$=1 to N) are arranged linearly side by side in such a manner as to satisfy the conditions described below.

(A1) Light emitted from a surface emitting element other than a predetermined surface emitting element 621-N among the N surface emitting elements 621-$i$ passes through the transmission member 612 and any of the optical filters 622-$i$, and is then reflected by the third surface 633 and any of the optical filters 622-$i$.

(A2) Light reflected by the third surface 633 and any of the optical filters 622-$i$ is combined with light emitted from the predetermined surface emitting element 621-N and having passed through the transmission member 612 and a predetermined one of the optical filters 622-N.

The wavelength multiplexing optical module 601 of FIG. 6 makes it possible to thin an optical module using surface emitting elements.

FIG. 7 illustrates a configuration example of a wavelength demultiplexing optical module of an embodiment. The wavelength demultiplexing optical module 701 of FIG. 7 includes a substrate 711, a transmission member 712, and a reflection member 713.

On the substrate 711, N light receiving elements 721-$i$ ($i$=1 to N) are arranged side by side in a predetermined direction. The transmission member 712 has a first surface 731 which is parallel to the substrate 711, and a second surface 732 which is opposite to the first surface 731. The reflection member 713 has a third surface 733 which is parallel to the second surface 732.

The second surface 732 is inclined in the above-mentioned predetermined direction relative to the first surface 731 and faces the third surface 733 with an air layer in between. On the second surface 732, N optical filters 722-$i$ ($i$=1 to N) are arranged linearly side by side in such a manner as to satisfy the conditions described below.

(B1) Light having a predetermined wavelength among light having N wavelengths contained in wavelength multiplexed light passes through a predetermined optical filter 722-N and the transmission member 712, thus being incident on a predetermined light receiving element 721-N among the N light receiving elements 721-$i$.

(B2) Light having a wavelength other than the predetermined wavelength is reflected by any of the optical filters 722-$i$ and the third surface 733 and passes through any of the optical filters 722-$i$ and the transmission member 712, thus being incident on the light receiving element 721-$i$ other than the predetermined light receiving element 721-N.

The wavelength demultiplexing optical module 701 of FIG. 7 makes it possible to thin an optical module using light receiving elements.

As an optical module of an embodiment that has functions of both of the wavelength multiplexing optical module 601 of FIG. 6 and the wavelength demultiplexing optical module 701 of FIG. 7, an optical module similar to that of FIG. 1 may be used, for example. Note that the optical module of this embodiment uses the transmission member and the reflection member as illustrated in FIGS. 6 and 7 instead of the optical block 201 of FIG. 2.

The substrate 101 corresponds to the substrate 611 of FIG. 6 and the substrate 711 of FIG. 7, the VCSELs 121-$i$ correspond to the surface emitting elements 621-$i$ of FIG. 6, and the PDs 122-$i$ correspond to light receiving elements 721-$i$ of FIG. 7. The direction in which the VCSELs 121-1 to 121-4 are arranged corresponds to the predetermined direction on the substrate 611, and the direction in which the PDs 122-1 to 122-4 are arranged corresponds to the predetermined direction on the substrate 711.

Another surface emitting element such as a vertical external cavity surface emitting laser or a horizontal cavity surface emitting laser may be used instead of the VCSEL 121-$i$ and another light receiving element such as a phototransistor may be used instead of the PD 122-$i$. In the case of transmitting and receiving N-channel optical signals, N surface emitting elements and N light receiving elements are mounted on the substrate 101.

Figure 8:
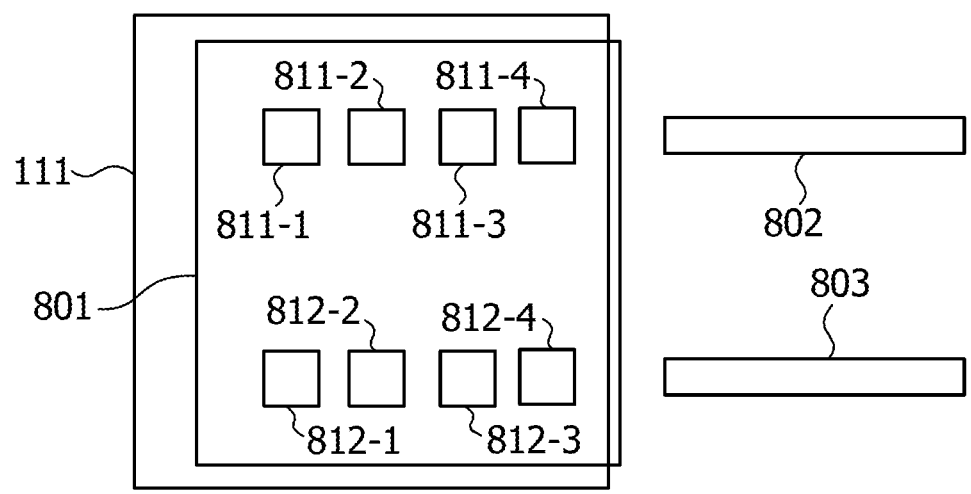
FIG. 8 is a configuration diagram of a transmission member.

FIG. 8 illustrates a configuration example of a transmission member included in the optical module. The transmission member 801 of FIG. 8 is fixed above a region 111, so that a space is left between the substrate 101 and the transmission member 801. The material of the transmission member 801 is, for example, glass, a transparent resin, or the like. The optical module of FIG. 8 uses an optical fiber 802 and an optical fiber 803 instead of the optical fiber 102 and the optical fiber 103 of FIG. 2, respectively.

On an extension line of the optical fiber 802 on the upper surface of the transmission member 801, disposed are wavelength filters 811-1 to 811-4. On an extension line of the optical fiber 803, disposed are wavelength filters 812-1 to 812-4. The wavelength filters 811-1 to 811-4 are arranged at equal intervals and the wavelength filters 812-1 to 812-4 are also arranged at equal intervals. The wavelength filters 811-$i$ and 812-$i$ ($i$=1 to 4) may be multilayer wavelength filters.

The transmission member 801 corresponds to the transmission member 612 of FIG. 6 and the transmission member 712 of FIG. 7, the wavelength filters 811-$i$ correspond to the optical filters 622-$i$ of FIG. 6, and the wavelength filters 812-$i$ correspond to the optical filters 722-$i$ of FIG. 7. Other optical filters such as long pass filters or short pass filters may be used instead of the wavelength filters 811-$i$ and 812-$i$.

Figure 9:
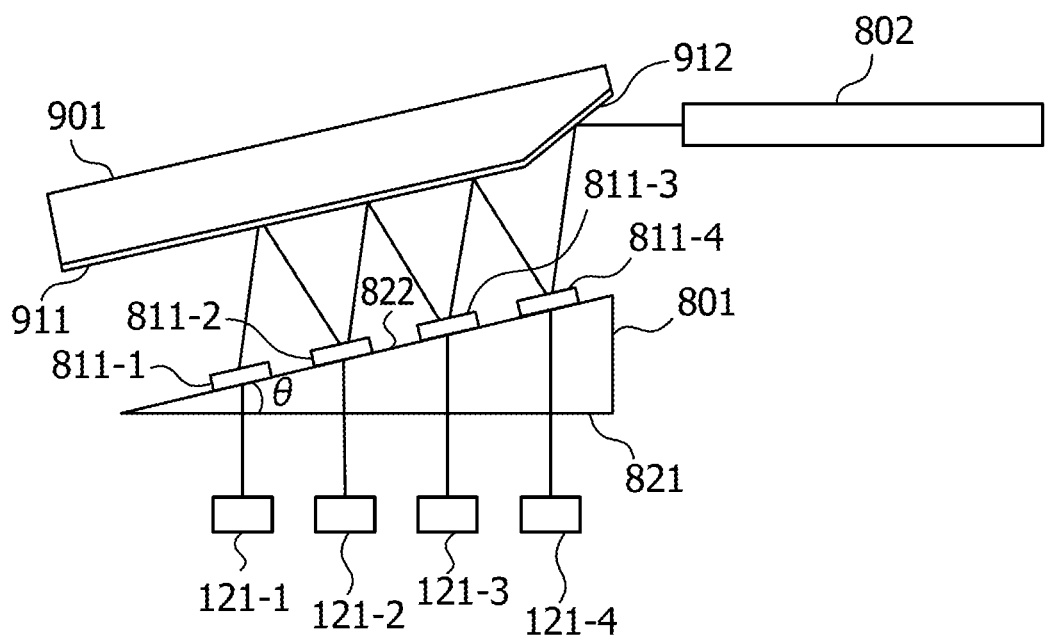
FIG. 9 is a diagram illustrating cross-sections of the transmission member and a reflection member.

FIG. 9 illustrates an example of a cross-section of the transmission member 801 and a reflection member 901 on an extension line of the optical fiber 802 of FIG. 8. The reflection member 901 corresponds to the reflection member 613 of FIG. 6 and the reflection member 713 of FIG. 7.

The transmission member 801 has a wedge-shaped cross-section. The transmission member 801 has a bottom surface 821 which is parallel to the substrate 101, and an upper surface 822. The reflection member 901 has a bottom surface 911 which is parallel to the upper surface 822, and a surface 912 which makes a predetermined angle with the bottom surface 911. The upper surface 822 of the transmission member 801 is inclined at an angle θ in a predetermined direction relative to the bottom surface 821, and faces the bottom surface 911 of the reflection member 901 with an air layer in between.

For example, the material of the reflection member 901 is the same as that of the transmission member 801, and reflection films are attached to the bottom surface 911 and the surface 912. Attaching the reflection films to the bottom surface 911 and the surface 912 makes it possible to reflect optical signals that are incident on the bottom surface 911 and the surface 912 even when the transmission member 801 and the reflection member 901 are made of the same material.

The bottom surface 821 of the transmission member 801 corresponds to the first surface 631 of FIG. 6 and the first surface 731 of FIG. 7, and the upper surface 822 corresponds to the second surface 632 of FIG. 6 and the second surface 732 of FIG. 7. The bottom surface 911 of the reflection member 901 corresponds to the third surface 633 of FIG. 6 and the third surface 733 of FIG. 7.

On the upper surface 822 of the transmission member 801, attached are wavelength filters 811-1 to 811-4. These wavelength filters 811-$i$ are arranged linearly side by side in such a manner as to satisfy the conditions described below.

(C1) Light emitted from a VCSEL 121-$i$ other than the VCSEL 121-4 closest to the optical fiber 802 passes through the transmission member 801 and any of the wavelength filters 811-$i$, and is then reflected by the bottom surface 911 and any of the wavelength filters 811-$i$.

(C2) Light reflected by the bottom surface 911 and any of the wavelength filters 811-$i$ is combined with light emitted from the VCSEL 121-4 and having passed through the transmission member 801 and the wavelength filter 811-4.

The transmission characteristics of the wavelength filters 811-1 to 811-4 are the same as the transmission characteristics of the wavelength filters 211-1 to 211-4 illustrated in FIG. 4.

The optical signal having a wavelength of $\lambda 1$ emitted from the VCSEL 121-1 passes through the transmission member 801 and the wavelength filter 811-1, and is then reflected by the bottom surface 911 and the wavelength filters 811-2 to 811-4. The optical signal having a wavelength of $\lambda 2$ emitted from the VCSEL 121-2 passes through the transmission member 801 and the wavelength filter 811-2, and is then reflected by the bottom surface 911 and the wavelength filters 811-3 and 811-4.

The optical signal having a wavelength of $\lambda 3$ emitted from the VCSEL 121-3 passes through the transmission member 801 and the wavelength filter 811-3, and is then reflected by the bottom surface 911 and the wavelength filter 811-4. The optical signal having a wavelength of $\lambda 4$ emitted from the VCSEL 121-4 passes through the wavelength filter 811-4, and is combined with the optical signals having wavelengths of $\lambda 1$ to $\lambda 3$ reflected by the wavelength filter 811-4. In this way, wavelength multiplexed light containing the optical signals having wavelengths of $\lambda 1$ to $\lambda 4$ is generated. The wavelength multiplexed light thus generated is reflected by the surface 912 and is emitted to the optical fiber 802 which is parallel to the substrate 101.

The cross-section of the transmission member 801 and a reflection member 901 on an extension line of the optical fiber 803 of FIG. 8 is the same as the cross-section illustrated in FIG. 9. In this case, the VCSELs 121-1 to 121-4 are replaced by the PDs 122-1 to 122-4 of FIG. 1, and the wavelength filters 811-1 to 811-4 are replaced by the wavelength filters 812-1 to 812-4 of FIG. 8. The optical fiber 802 is replaced by the optical fiber 803 of FIG. 8.

The wavelength multiplexed light emitted from the optical fiber 803 which is parallel to the substrate 101 is reflected by the surface 912 of the reflection member 901 and is incident on the wavelength filter 812-4. The wavelength filters 812-$i$ are arranged linearly side by side in such a manner as to satisfy the conditions described below.

(D1) Light having a wavelength of $\lambda 4$ among light having wavelengths of $\lambda 1$ to $\lambda 4$ contained in the wavelength multiplexed light passes through the wavelength filter 812-4 and the transmission member 801, thus being incident on the PD 122-4.

(D2) Light having wavelengths of $\lambda 1$ to $\lambda 3$ is reflected by any of the wavelength filters 812-$i$ and the bottom surface 911, and then passes through any of the wavelength filters 812-$i$ and the transmission member 801, thus being incident on the PDs 122-1 to 122-3.

The transmission characteristics of the wavelength filters 812-1 to 812-4 are the same as the transmission characteristics of the wavelength filters 211-1 to 211-4 illustrated in FIG. 4.

Light having a wavelength of $\lambda 1$ is reflected by the wavelength filters 812-2 to 812-4 and the bottom surface 911, and then passes through the wavelength filter 812-1 and the transmission member 801, thus being incident on the PD 122-1. Light having a wavelength of $\lambda 2$ is reflected by the wavelength filters 812-3 and 812-4 and the bottom surface 911, and then passes through the wavelength filter 812-2 and the transmission member 801, thus being incident on the PD 122-2. Light having a wavelength of $\lambda 3$ is reflected by the wavelength filter 812-4 and the bottom surface 911, and then passes through the wavelength filter 812-3 and the transmission member 801, thus being incident on the PD 122-3.

According to such an optical module, since the upper surface 822 of the transmission member 801 is inclined at the angle $\theta$ relative to the bottom surface 821, it is possible to perform wavelength multiplexing or wavelength demultiplexing while reflecting optical signals back and forth between the transmission member 801 and the reflection member 901.

The transmission member 801 is made of a material having a large refractive index such as glass, and the space between the transmission member 801 and the reflection member 901 is an air layer having a refractive index of 1. For this reason, it is possible to increase the emission angle of light emitted from the wavelength filter 811-$i$ and the incident angle of light incident on the wavelength filter 812-$i$. Hence, even when the distance between the transmission member 801 and the reflection member 901 is short, it becomes possible to send an optical signal from one wavelength filter to the next wavelength filter by reflecting the optical signal back and forth, and to thus reduce the thickness of the optical module.

Disposing the surface 912, which makes a predetermined angle with the bottom surface 911 of the reflection member 901, makes it possible to emit wavelength multiplexed light in the horizontal direction, which is parallel to the substrate 101, and to make the wavelength multiplexed light incident from the horizontal direction. Hence, the optical fiber does not have to have a bent end portion as illustrated in FIG. 3, and it is possible to further reduce the thickness of the optical module.

Figure 10:
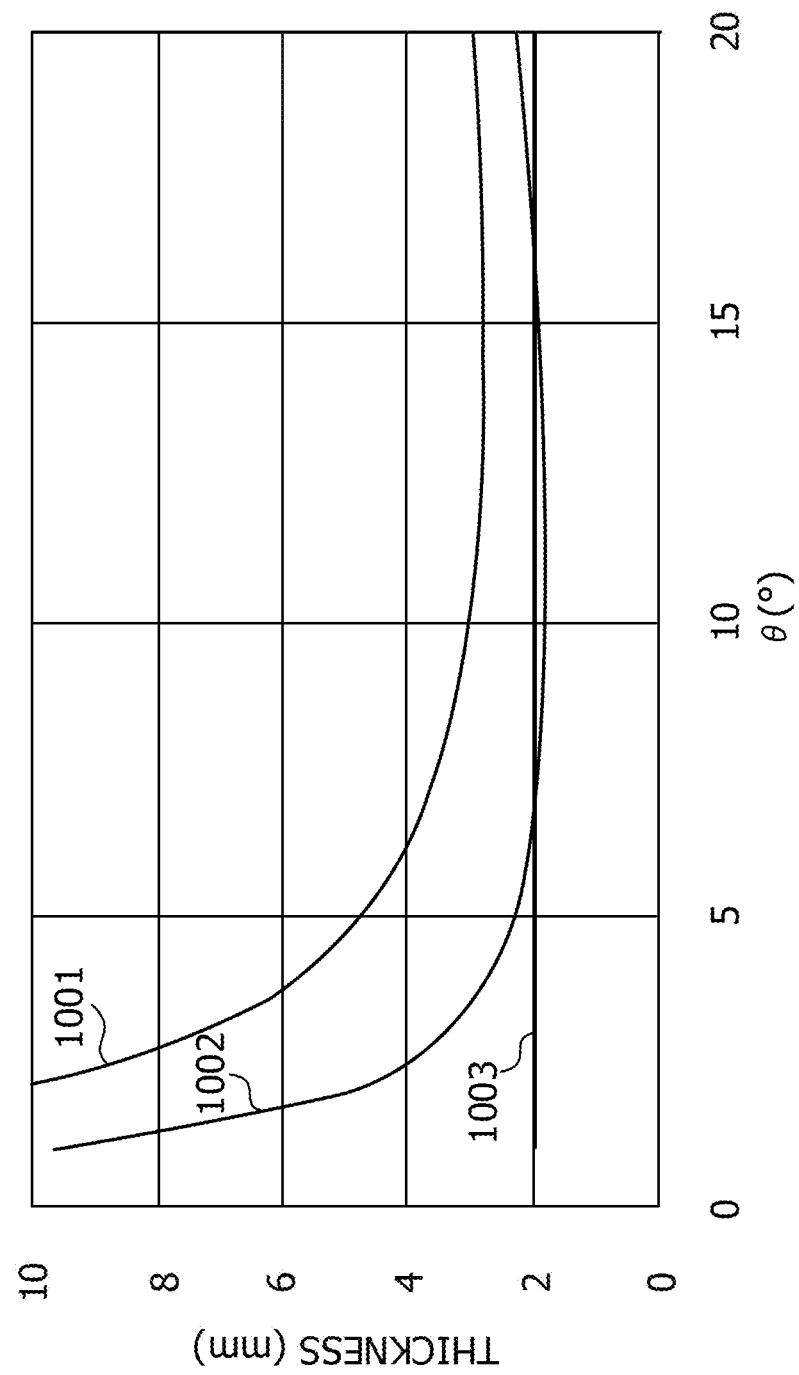
FIG. 10 is a graph illustrating a relation between angle and thickness.

FIG. 10 illustrates an example of a relation between the angle $\theta$ of the upper surface 822 of the transmission member 801 and the thickness from the bottom surface 821 to the upper end of the reflection member 901. The horizontal axis represents angle $\theta$ (°) and the vertical axis represents thickness (mm). In this example, the VCSELs 121-$i$ and the PDs 122-$i$ are arranged at intervals of 0.5 mm on the substrate 101.

The curve 1001 represents change in thickness when the optical block 201 of FIG. 3 is used and the curve 1002 represents change in thickness when the transmission member 801 and the reflection member 901 of FIG. 9 are used. The straight line 1003 represents a target value (2 mm) determined from the specifications of the MSA. In the case of the curve 1001, the angle $\theta$ represents the angle of the bottom surface of the optical block 201 to the substrate 101.

The thickness represented by the curve 1001 maintains higher than the target value indicated by the straight line 1003 even when the angle $\theta$ changes. In contrast, the thickness represented by the curve 1002 becomes lower than or equal to the target value when the angle θ is set at around 10°. As described above, using the transmission member 801 and the reflection member 901 of FIG. 9 makes it possible to reduce the thickness from the bottom surface 821 of the transmission member 801 to the upper end of the reflection member 901 to the target value or less, and to thus achieve a thin optical module.

The optical module using the transmission member 801 and the reflection member 901 may be used as a QSFP module, a QSFP-DD module, an Octal Small Form-factor Pluggable (OSFP) module, or the like. The QSFP-DD module has a structure in which components included in a QSFP module are stacked in two stages and is capable of transmitting and receiving 8-channel optical signals. The OSFP module is also capable of transmitting and receiving 8-channel optical signals. In the case of transmitting and receiving 8-channel optical signals, 8 wavelength filters 811-*i* and 8 wavelength filters 812-*i* are arranged on the transmission member 801.

Figure 11:
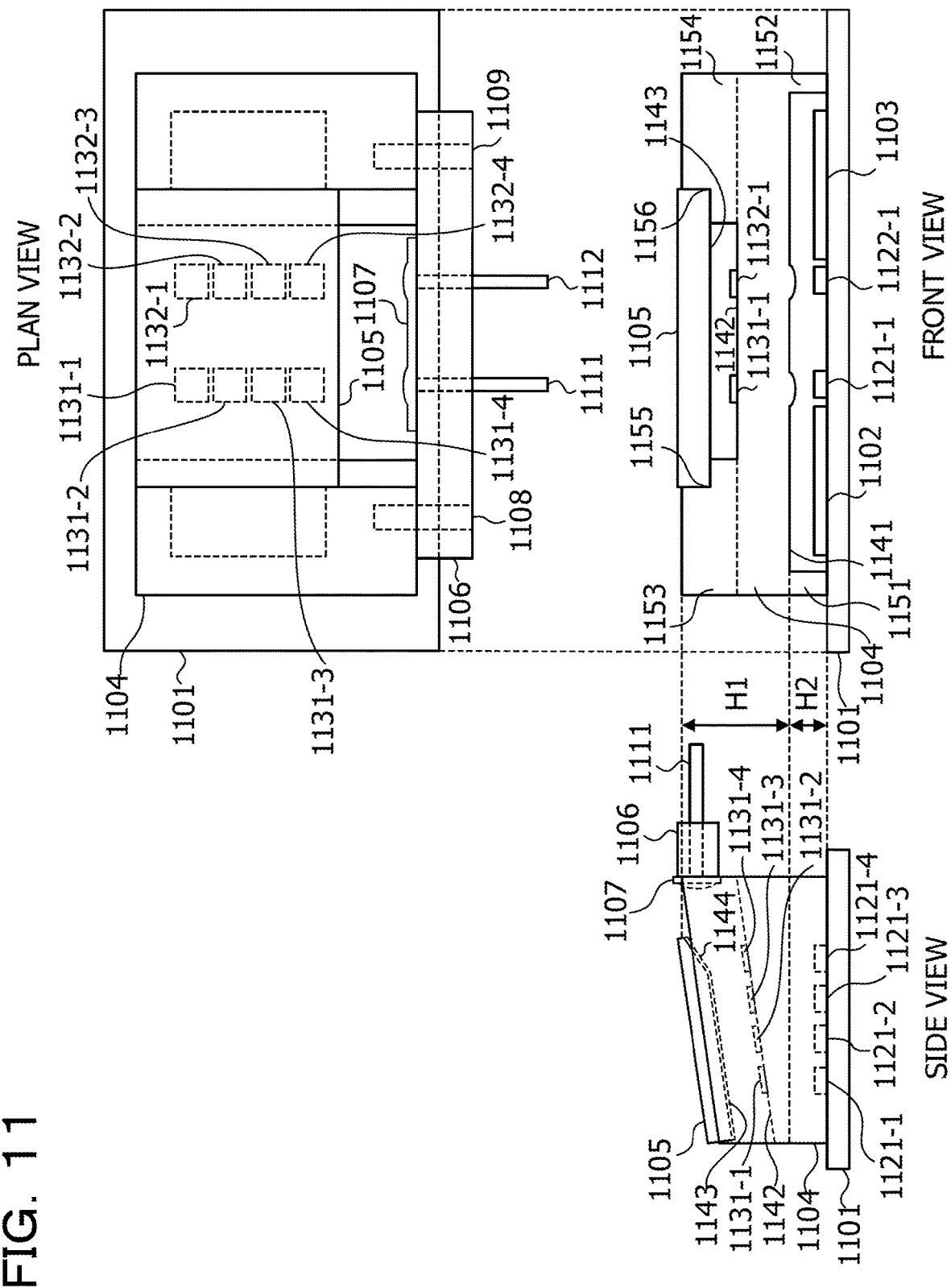
FIG. 11 is a three-view diagram of an optical module.
Figure 12:
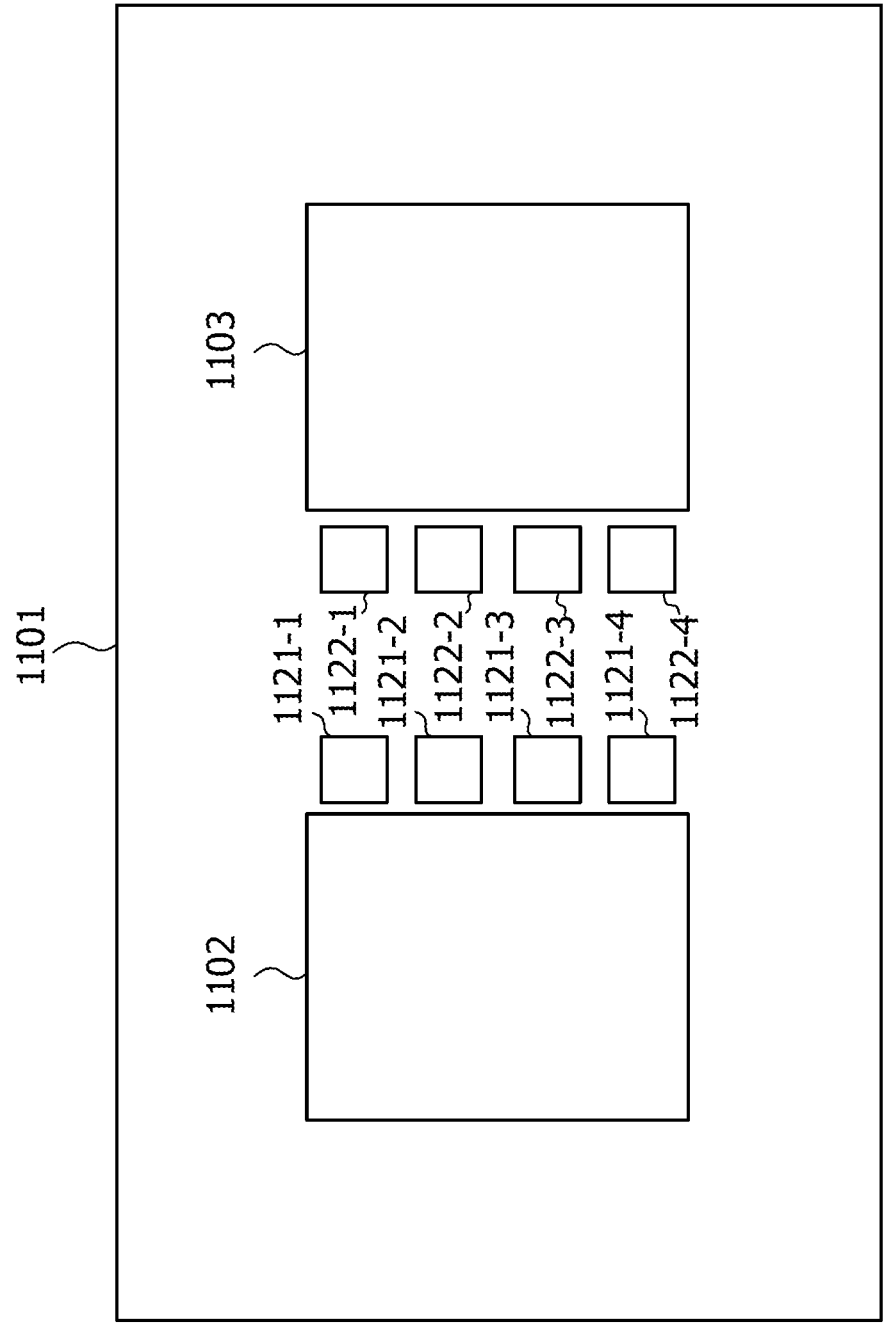
FIG. 12 is a plan view of a substrate.

FIG. 11 illustrates an example of a three-view diagram of an optical module. FIG. 12 illustrates an example of a plan view of a substrate 1101 of FIG. 11. The optical module of FIGS. 11 and 12 includes the substrate 1101, a transmission member 1104, and a reflection member 1105.

As illustrated in FIG. 12, on the substrate 1101, mounted are a transmission circuit 1102, a reception circuit 1103, VCSELs 1121-1 to 1121-4, and PDs 1122-1 to 1122-4.

As illustrated in a side view of FIG. 11, the transmission member 1104 has a trapezoidal cross-section. The transmission member 1104 has a bottom surface 1141 which is parallel to the substrate 1101, and an upper surface 1142. The reflection member 1105 has a bottom surface 1143 which is parallel to the upper surface 1142, and a surface 1144 which makes a predetermined angle with the bottom surface 1143. The upper surface 1142 of the transmission member 1104 is inclined in a predetermined direction relative to the bottom surface 1141, and faces the bottom surface 1143 of the reflection member 1105 with an air layer in between.

On the upper surface 1142 of the transmission member 1104, wavelength filters 1131-1 to 1131-4 are arranged linearly side by side in the predetermined direction, and wavelength filters 1132-1 to 1132-4 are also arrange linearly side by side in the predetermined direction.

The substrate 1101, the transmission circuit 1102, the reception circuit 1103, the VCSELs 1121-*i*, and the PDs 1122-*i* correspond to the substrate 101 of FIG. 1, the transmission circuit 112, the reception circuit 113, the VCSELs 121-*i*, and the PDs 122-*i*, respectively.

The transmission member 1104 and the reflection member 1105 correspond to the transmission member 801 and the reflection member 901 of FIG. 9, respectively, and the wavelength filters 1131-*i* and the wavelength filters 1132-*i* correspond to the wavelength filters 811-*i* and the wavelength filters 812-*i* of FIG. 8, respectively. Hence, the wavelength filters 1131-*i* are arranged in such a manner as to satisfy the same conditions as (C1) and (C2) and the wavelength filters 1132-*i* are arranged in such a manner as to satisfy (D1) and (D2).

An optical fiber 1111 for transmission and an optical fiber 1112 for reception are fixed to the transmission member 1104 using a ferrule 1106, a mechanical transfer (MT) pin 1108, and a MT pin 1109. In the transmission member 1104 and the ferrule 1106, holes for MT pins are formed. The center lines of the optical fiber 1111 and the optical fiber 1112 are positioned in a self-alignment manner by the MT pin 1108 and the MT pin 1109.

A lens 1107 is fixed to the ferrule 1106. Wavelength multiplexed light reflected by the surface 1144 of the reflection member 1105 is concentrated by the lens 1107 and is emitted to the optical fiber 1111. Wavelength multiplexed light emitted from the optical fiber 1112 is concentrated by the lens 1107 and is incident on the surface 1144.

As illustrated in a front view of FIG. 11, the transmission member 1104 includes a substrate-side spacer portion 1151 and a substrate-side spacer portion 1152 which are in contact with the substrate 1101. The substrate-side spacer portion 1151 and the substrate-side spacer portion 1152 hold the bottom surface 1141 of the transmission member 1104 in parallel to the substrate 1101. This makes it possible to fix the transmission member 1104 to the substrate 1101 while leaving a space for mounting the transmission circuit 1102, the reception circuit 1103, the VCSELs 1121-*i*, and the PDs 1122-*i* between the bottom surface 1141 and the substrate 1101.

In the case where the optical module is used as a QSFP module, it is desirable that the height H2 from the surface of the substrate 1101 to the bottom surface 1141 of the transmission member 1104 be set to about 1 mm. In this case, the height of the substrate-side spacer portion 1151 and the substrate-side spacer portion 1152 is also set to about 1 mm.

The transmission member 1104 includes a reflection member-side spacer portion 1153 and a reflection member-side spacer portion 1154 which are in contact with the reflection member 1105. The reflection member-side spacer portion 1153 and the reflection member-side spacer portion 1154 hold the bottom surface 1143 of the reflection member 1105 in parallel to the upper surface 1142 of the transmission member 1104. This makes it possible to fix the reflection member 1105 to the transmission member 1104 while leaving a space for mounting the wavelength filters 1131-*i* and the wavelength filters 1132-*i* and also for optical signals to be reflected back and forth to propagate, between the bottom surface 1143 and the upper surface 1142.

In the case where the optical module is used as a QSFP module, it is desirable that the height H1 from the bottom surface 1141 of the transmission member 1104 to the upper end of the reflection member 1105 be set to about 2 mm or less. In this case, the height from the bottom surface 1141 of the transmission member 1104 to the upper end of the transmission member 1104 is also set to 2 mm or less.

In the reflection member-side spacer portion 1153, a cut groove 1155 which supports the reflection member 1105 is formed. In the reflection member-side spacer portion 1154, a cut groove 1156 which supports the reflection member 1105 is formed. Forming the cut groove 1155 and the cut groove 1156 makes it easy to position the reflection member 1105 relative to the transmission member 1104 and thus makes it possible to hold the bottom surface 1143 in parallel to the upper surface 1142 with high precision.

The configurations of the optical module of FIGS. 1 to 3 and the QSFP module of FIG. 5 are merely examples, and some of the constituent elements may be omitted or modified depending on the usage or conditions of the optical module or the QSFP module.

The configurations of the wavelength multiplexing optical module of FIG. 6 and the wavelength demultiplexing optical module of FIG. 7 are merely examples, and some of the constituent elements may be omitted or modified depending on the usage or conditions of the wavelength multiplexing optical module or the wavelength demultiplexing optical module.

The configuration of the optical module of FIGS. 8 and 9 is merely an example, and some of the constituent elements may be omitted or modified depending on the usage or conditions of the optical module. For example, in the case of transmitting and receiving N-channel optical signals, N wavelength filters 811-*i* and N wavelength filters 812-*i* are arranged on the transmission member 801. Instead of forming the surface 912 in the reflection member 901, the end portion of the optical fiber 802 may be bent downward, as illustrated in FIG. 3, such that wavelength multiplexed light is incident on the optical fiber 802.

The configuration of the optical module of FIGS. 11 and 12 is merely an example, and some of the constituent elements may be omitted or modified depending on the usage or conditions of the optical module. For example, in the case of transmitting and receiving N-channel optical signals, N VCSELs 1121-*i* and N PDs 1122-*i* are mounted on the substrate 1101, and N wavelength filters 1131-*i* and N wavelength filters 1132-*i* are arranged on the transmission member 1104. Instead of forming the surface 1144 in the reflection member 1105, the end portion of the optical fiber 1111 may be bent downward, as illustrated in FIG. 3, such that wavelength multiplexed light is incident on the optical fiber 1111.

The transmission characteristics of the wavelength filter 211-*i* illustrated in FIG. 4 are merely examples, and the transmission characteristics vary depending on the wavelength filters to be used. The relation between the angle θ and the thickness illustrated in FIG. 10 is merely an example, and the relation between the angle θ and the thickness varies depending on the numbers and the arrangement intervals of VCSELs 121-*i* and PDs 122-*i* to be used.

Although the disclosed embodiments and their advantages have been described in detail, various modifications, additions, and omissions may be made by those skilled in the art without departing from the scope explicitly described in Claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength multiplexing optical module comprising:
a substrate;
a transmission member; and
a reflection member, wherein
on the substrate, a plurality of surface emitting elements which emit light having different wavelengths are arranged side by side in a predetermined direction,
the transmission member has a first surface which is parallel to the substrate and a second surface which is opposite to the first surface,
the reflection member has a third surface which is parallel to the second surface of the transmission member,
the second surface of the transmission member is inclined in the predetermined direction relative to the first surface and faces the third surface of the reflection member with an air layer in between,
on the second surface of the transmission member, a plurality of optical filters are arranged linearly side by side, and
the plurality of optical filters are arranged such that
light emitted from a surface emitting element other than a predetermined surface emitting element among the plurality of surface emitting elements passes through the transmission member and any of the optical filters, and is then reflected by the third surface of the reflection member and any of the optical filters, being combined with light emitted from the predetermined surface emitting element and having passed through the transmission member and a predetermined optical filter,
the reflection member further has a fourth surface which makes a predetermined angle with the third surface in the predetermined direction, and
the reflection member is fixed such that light emitted from the plurality of surface emitting elements and combined is reflected by the fourth surface to be emitted to an optical fiber which is parallel to the substrate.

2. The wavelength multiplexing optical module according to claim 1, wherein
materials of the transmission member and the reflection member are glass, and
the third surface and the fourth surface of the reflection member each have a reflection film.

3. The wavelength multiplexing optical module according to claim 1, wherein
the transmission member includes a reflection member-side spacer portion which is in contact with the reflection member, and
the reflection member-side spacer portion holds the third surface of the reflection member in parallel to the second surface of the transmission member.

4. The wavelength multiplexing optical module according to claim 3, wherein in the reflection member-side spacer portion, a cut groove which supports the reflection member is formed.

5. The wavelength multiplexing optical module according to claim 1, wherein
the transmission member includes a substrate-side spacer portion which is in contact with the substrate, and
the substrate-side spacer portion holds the first surface of the transmission member in parallel to the substrate.

6. A wavelength demultiplexing optical module comprising:
a substrate;
a transmission member; and
a reflection member, wherein
on the substrate, a plurality of light receiving elements are arranged side by side in a predetermined direction,
the transmission member has a first surface which is parallel to the substrate and a second surface which is opposite to the first surface,
the reflection member has a third surface which is parallel to the second surface of the transmission member,
the second surface of the transmission member is inclined in the predetermined direction relative to the first surface and faces the third surface of the reflection member with an air layer in between,
on the second surface of the transmission member, a plurality of optical filters are arranged linearly side by side, and
the plurality of optical filters are arranged such that
light having a predetermined wavelength among light having a plurality of wavelengths contained in wavelength multiplexed light passes through a predetermined one of the optical filters and the transmission member, being incident on a predetermined light receiving element among the plurality of light receiving elements, and light having a wavelength other than the predetermined wavelength among the light having the plurality of wavelengths is reflected by any of the optical filters and the third surface of the reflection member and then passes through any of the optical filters and the transmission member, being incident on a light receiving element other than the predetermined light receiving element among the plurality of light receiving elements, the reflection member further has a fourth surface which makes a predetermined angle with the third surface in the predetermined direction, and the reflection member is fixed such that the wavelength multiplexed light is emitted from an optical fiber which is parallel to the substrate and is reflected by the fourth surface, being incident on the predetermined light receiving element.

7. The wavelength demultiplexing optical module according to claim 6, wherein materials of the transmission member and the reflection member are glass, and the third surface and the fourth surface of the reflection member each have a reflection film.

8. The wavelength demultiplexing optical module according to claim 6, wherein the transmission member includes a reflection member-side spacer portion which is in contact with the reflection member, and the reflection member-side spacer portion holds the third surface of the reflection member in parallel to the second surface of the transmission member.

9. The wavelength demultiplexing optical module according to claim 8, wherein in the reflection member-side spacer portion, a cut groove which supports the reflection member is formed.

10. The wavelength demultiplexing optical module according to claim 6, wherein the transmission member includes a substrate-side spacer portion which is in contact with the substrate, and the substrate-side spacer portion holds the first surface of the transmission member in parallel to the substrate.

11. An optical module comprising:
a substrate;
a transmission member; and
a reflection member, wherein on the substrate, a plurality of surface emitting elements which emit light having different wavelengths are arranged side by side in a predetermined direction, and a plurality of light receiving elements are arranged side by side in the predetermined direction, the transmission member has a first surface which is parallel to the substrate and a second surface which is opposite to the first surface, the reflection member has a third surface which is parallel to the second surface of the transmission member, the second surface of the transmission member is inclined in the predetermined direction relative to the first surface and faces the third surface of the reflection member with an air layer in between, on the second surface of the transmission member, a plurality of first optical filters are arranged linearly side by side, and a plurality of second optical filters are arranged linearly side by side, the plurality of first optical filters are arranged such that light emitted from a surface emitting element other than a predetermined surface emitting element among the plurality of surface emitting elements passes through the transmission member and any of the first optical filters, and is then reflected by the third surface of the reflection member and any of the first optical filters, being combined with light emitted from the predetermined surface emitting element and having passed through the transmission member and a predetermined one of the first optical filters, and the plurality of second optical filters are arranged such that light having a predetermined wavelength among light having a plurality of wavelengths contained in wavelength multiplexed light passes through a predetermined one of the second optical filters and the transmission member, being incident on a predetermined light receiving element among the plurality of light receiving elements, and light having a wavelength other than the predetermined wavelength among the light having the plurality of wavelengths is reflected by any of the second optical filters and the third surface of the reflection member, and then passes through any of the second optical filter and the transmission member, being incident on a light receiving element other than the predetermined light receiving element.

* * * * *